United States Patent
Kim

(10) Patent No.: US 8,995,765 B2
(45) Date of Patent: Mar. 31, 2015

(54) DIGITAL IMAGE PROCESSING APPARATUS AND METHOD

(71) Applicant: SK Hynix Inc., Icheon-si, Gyeonggi-do (KR)

(72) Inventor: Young Hyun Kim, Seoul (KR)

(73) Assignee: SK Hynix Inc., Gyeonggi-do (KR)

( * ) Notice: Subject to any disclaimer, the term of this patent is extended or adjusted under 35 U.S.C. 154(b) by 327 days.

(21) Appl. No.: 13/712,299

(22) Filed: Dec. 12, 2012

(65) Prior Publication Data

US 2013/0148890 A1 Jun. 13, 2013

(30) Foreign Application Priority Data

Dec. 13, 2011 (KR) ........................ 10-2011-0133743

(51) Int. Cl.
*G06K 9/00* (2006.01)
*G06T 5/00* (2006.01)

(52) U.S. Cl.
CPC ................. *G06T 5/007* (2013.01); *G06T 5/003* (2013.01); *G06T 2207/10024* (2013.01); *G06T 2207/20032* (2013.01); *G06T 2207/20192* (2013.01)
USPC ......................................... 382/167; 382/266

(58) Field of Classification Search
USPC .......... 382/162, 167, 199, 264, 266, 274, 275
See application file for complete search history.

(56) References Cited

U.S. PATENT DOCUMENTS

| 2005/0220337 A1 | 10/2005 | Arazaki |
| 2008/0298722 A1* | 12/2008 | Lee et al. ....................... 382/300 |
| 2009/0052797 A1* | 2/2009 | Matsushita et al. ........... 382/260 |

FOREIGN PATENT DOCUMENTS

| JP | 2004126797 A | 4/2004 |
| JP | 2005167974 A | 6/2005 |

* cited by examiner

*Primary Examiner* — Phuoc Tran
(74) *Attorney, Agent, or Firm* — William Park & Associates Patent Ltd.

(57) ABSTRACT

A digital image processing apparatus and method are provided. The digital image processing apparatus includes: a Y component processing unit receiving a Y component and performing edge enhancement processing and first noise reduction processing on the Y component by using a memory allocated to the Y component; and a CbCr processing unit receiving a Cb component and a Cr component, and performing false color suppression processing and second noise reduction processing on the Cb component and the Cr component by using a memory allocated to the Cb component and the Cr component, where the Y component, the Cb component and the Cr component are variables of the YCbCr color space.

16 Claims, 7 Drawing Sheets

DIGITAL IMAGE PROCESSING APPARATUS AND METHOD

CROSS-REFERENCE TO RELATED APPLICATIONS

The present application claims priority under 35 U.S.C. 119(a) to Korean Patent Application No. 10-2011-0133743 filed on Dec. 13, 2011, in the Korean Intellectual Property Office, which is incorporated by reference herein in its entirety.

BACKGROUND OF THE INVENTION

1. Field of the Invention

Embodiments of the inventive concept relate to a digital image processing apparatus and method configured in consideration of effective memory use.

2. Description of the Related Art

Operations for improving digital image quality include edge enhancement, noise reduction, false color suppression, and the like.

Edge enhancement involves determining whether an edge of an image is present in the image, and then adjusting pixel values in the edge region to enhance image sharpness (clarity or definition). Noise reduction refers to performing low pass filtering to reduce noise. The low pass filtering may be performed by using an averaging filter or a median filter. False color suppression involves eliminating false colors from an image. False color is generated in performing color interpolation in an image signal processing system, and the false color suppression operation is performed by determining whether a false color is present and then eliminating a false color.

In order to perform edge enhancement, noise reduction, false color suppression, and the like, a memory is required. In general, a static random access memory (SRAM) is used as a memory for performing these operations. Accordingly, an increase in the size of the memory in use leads to an increase in the size of an image sensor chip.

SUMMARY OF THE INVENTION

An aspect of the inventive concept provides a digital image processing apparatus capable of effectively using a memory.

Another aspect of the inventive concept provides a digital image processing method for achieving the object of the inventive concept.

According to an aspect of the inventive concept, there is provided a digital image processing apparatus including: a Y component processing unit receiving a Y component and performing edge enhancement processing and first noise reduction processing on the Y component by using a memory allocated to the Y component; and a CbCr processing unit receiving a Cb component and a Cr component, and performing false color suppression processing and second noise reduction processing on the Cb component and the Cr component by using a memory allocated to the Cb component and the Cr component, where the Y component, the Cb component and the Cr component are variables of a YCbCr color space.

According to another aspect of the inventive concept, there is provided a digital image processing method including: allocating memories to a Y component, a Cb component, and a Cr component; performing edge enhancement processing and first noise reduction processing on the Y component by using a memory allocated to the Y component; and performing false color suppression processing and second noise reduction processing on the Cb component and the Cr component by using a memory allocated to the Cb component and the Cr component.

BRIEF DESCRIPTION OF THE DRAWINGS

The above and other aspects, features and other advantages of the inventive concept will be more clearly understood from the following detailed description taken in conjunction with the accompanying drawings, in which.

DETAILED DESCRIPTION OF THE PREFERRED EMBODIMENT

Figure 1:
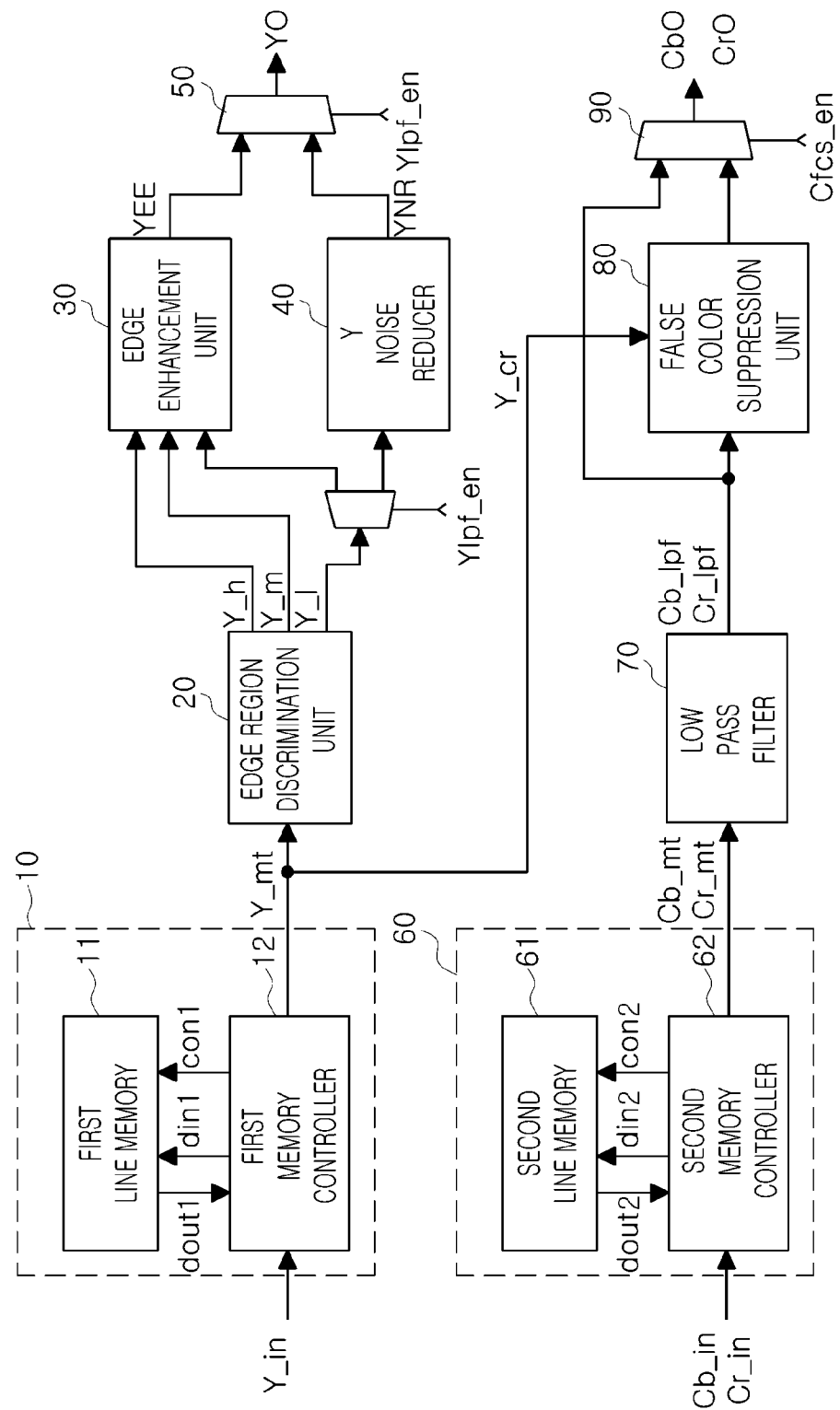
FIG. 1 is a schematic block diagram showing a configuration of a digital image processing apparatus according to an embodiment of the inventive concept.

Embodiments of the inventive concept will be described in detail with reference to the accompanying drawings. The invention may, however, be embodied in many different forms and should not be construed as being limited to the embodiments set forth herein. Rather, these embodiments are provided so that this disclosure will be thorough, and will fully convey a scope of the invention to those skilled in the art. In the drawings, the shapes and dimensions of elements may be exaggerated for clarity, and the same reference numerals will be used throughout to designate the same or like components.

FIG. 1 is a schematic block diagram showing a configuration of a digital image processing apparatus according to an embodiment of the inventive concept. The digital image processing apparatus according to an embodiment of the inventive concept may include a first memory unit 10, an edge region discrimination unit 20, a demultiplexer 25, an edge enhancement unit 30, a Y noise canceling unit 40, a first multiplexer 50, a second memory unit 60, a low pass filter 70, a false color suppression unit 80, and a second multiplexer 90. The first memory unit 10 may include a first line memory 11 and a first memory controller 12. The second memory unit 60 may include a second line memory 61 and a second memory controller 62.

The blocks illustrated in FIG. 1 have the following functions.

The first memory unit 10, including the first line memory 11 and the first memory controller 12, receives an input Y component Y_in and generates Y matrix data Y_mt.

The first memory controller 12 outputs a first control signal con1 to write first write data din1 in the first memory and read first read data dout1 from the first line memory 11. The first memory unit 10 may also generate the Y matrix data Y_mt by using the input Y component Y_in and the first read data dout1 which has been read from the first memory 11. The Y matrix data Y_mt may be 5×5 matrix.

In response to the first control signal con1, the first line memory 11 stores the first write data din1 and outputs the first read data dout1. The first line memory 11 may have a static random access memory (SRAM) type line memory having an address space corresponding to an input image width. In this case, the first line memory 11 may have four SRAM type line memories, and each of the SRAM type line memories may be an 8-bit memory. The frequency of a clock signal input to the first line memory 11 may be ½ of the frequency of an operation clock of the digital image processing apparatus.

The edge region discrimination unit 20 receives the Y matrix data Y_mt, detects edges, discriminates edge regions by using the detected edges, and outputs Y data (Y_h, Y_m, Y_l) relating to each edge region. For example, the edge region discrimination unit 20 may generate a local matrix within the Y matrix data Y_m, detect edges in consideration of four directions, such as a vertical direction, a horizontal direction, a diagonal direction (the diagonal direction may extend from a pixel residing in the first row and first column of a matrix, toward a pixel residing in the last row and last column of the matrix), and a reverse diagonal direction (the reverse diagonal direction may extend from a pixel residing in the first row and last column of the matrix, toward a pixel residing in the last row and first column of the matrix), and the edge region discrimination unit 20 may discriminate the edge regions into a low edge region, a middle edge region, and a high edge region. The edge region discrimination unit 20 outputs high edge Y data Y_h, middle edge Y data Y_m, and low edge Y data Y_l according to the discriminated regions. Details of a method of discriminating the edge region will be described with reference to FIG. 3.

In response to a filtering enable signal Ylpf_en, the demultiplexer 25 outputs the low edge Y data Y_l to the edge enhancement unit 30 or the Y noise reducer.

The edge enhancement unit 30 receives the high edge Y data Y_h and the middle edge Y data Y_m, or the high edge Y data Y_h, the middle edge Y data Y_m, and the low edge Y data Y_i and outputs an edge-enhanced Y component YEE. In this case, the edge enhancement unit 30 may sequentially calculate a region gain and an adjustment gain with respect to the input Y component (i.e., high edge Y data Y_h, the middle edge Y data Y_m, and/or the low edge Y data Y_l), calculate a brightness difference, and the edge-enhanced Y component YEE by using the adjustment gain, the brightness difference, and the input Y component. A specific operation of generating the edge-enhanced Y component YEE will be described later with reference to FIGS. 3 through 5.

The Y noise reducer 40 receives the low edge Y data Y_l and outputs a noise-reduced Y component YNR. A specific operation of the Y noise reducer 40 will be described later with reference to FIG. 3.

In response to the filtering enable signal Ylpf_en, the first multiplexer 50 outputs the edge-enhanced Y component YEE or the noise-reduced Y component YNR as a final Y component YO. Namely, the low edge Y data Y_l (i.e., the Y component of the low edge region) is edge-enhanced through the edge enhancement unit 30 so as to be output as the final Y component YO or may be noise-reduced through the Y noise reducer 40 so as to be output as the final Y component YO.

The second memory unit 60, including a second line memory 61 and a second memory controller 62, receives an input Cb component Cb_in and an input Cr component Cr_in and generates Cb matrix data Cb_mt and Cr matrix data Cr_mt. The Y component, Cb, and Cr may be variables of the YCbCr color space where the Y component may be brightness (luma), Cb and Cr may be blue-difference and red-difference chroma components.

The second memory controller 62 outputs a second control signal con2 to write second write data din2 in the second line memory 61 and read second read data dout2 from the second line memory 61. The second memory controller 62 may also generate the Cb matrix data Cb_mt and the Cr matrix data Cr_mt by using the input Cb component Cb_in and the input Cr component Cr_in and the second read data dout2 read from the second line memory 61. In detail, the second memory controller 62 may generate the Cb matrix data Cb_mt and the Cr matrix data Cr_mt by using the Cb data and the Cr data obtained by averaging-filtering the input Cb component Cb_in and the input Cr component Cr_in and the second read data dout2. The second memory controller 62 may average-filter the input Cb component Cb_in and the input Cr_component Cr_in, respectively, to perform YCrCb 4:2:2 compression. Each of the Cb matrix data Cb_mt and the Cr matrix data Cr_mt may be 5×5 matrix data.

In response to the second control signal con2, the second line memory 61 stores the second write data din2 and outputs the second read data dout2. The second line memory 61 may include an SRAM type line memory having an address space corresponding to an input image width. In this case, the second line memory 61 may have four SRAM type line memories, and each of the four SRAM type line memories may be an 8-bit memory. The frequency of a clock signal input to the second line memory 61 may be ½ of the frequency of an operation clock of the digital image processing apparatus.

The low pass filter 70 low-pass-filters the Cb matrix data Cb_mt and the Cr matrix data Cr_mt to generate filtered Cb data Cb_lpf and filtered Cr data Cr_lpf.

The false color suppression unit 80 receives the filtered Cb data Cb_lpf and filtered Cr data Cr_lpf and the Y component Y_cr of the current pixel and performs a false color suppression operation. When the false color suppression operation is performed on the pixel at a position (x,y), the Y component of the current pixel may have a size of the Y component of the pixel at (x,y) position. Also, as mentioned above, when the Y matrix data Y_mt is 5×5 matrix data Y11 to Y55, the Y component Y_cr of the current pixel may be Y33 of the Y matrix data Y_mt. A detailed operation of the false color suppression unit 80 will be described with reference to FIG. 7.

In response to a false enable signal Cfcs_en, the second multiplexer 90 outputs one of the filtered Cb data Cb_lpf and filtered Cr data Cr_lpf and an output signal from the false color suppression unit 80 as final Cb data CbO and final Cr data CrO. In some embodiments, the first memory unit 10, the edge region discrimination unit 20, the edge enhancement unit 30, the Y noise canceling unit 40, the demultiplexer 25 and the first multiplexer 50 may cooperatively operate as a Y component processing unit. Also, the second memory unit 60, the low pass filter 70, the false color suppression unit 80 and the second multiplexer 90 may operate cooperatively as a CbCr processing unit.

Figure 2:
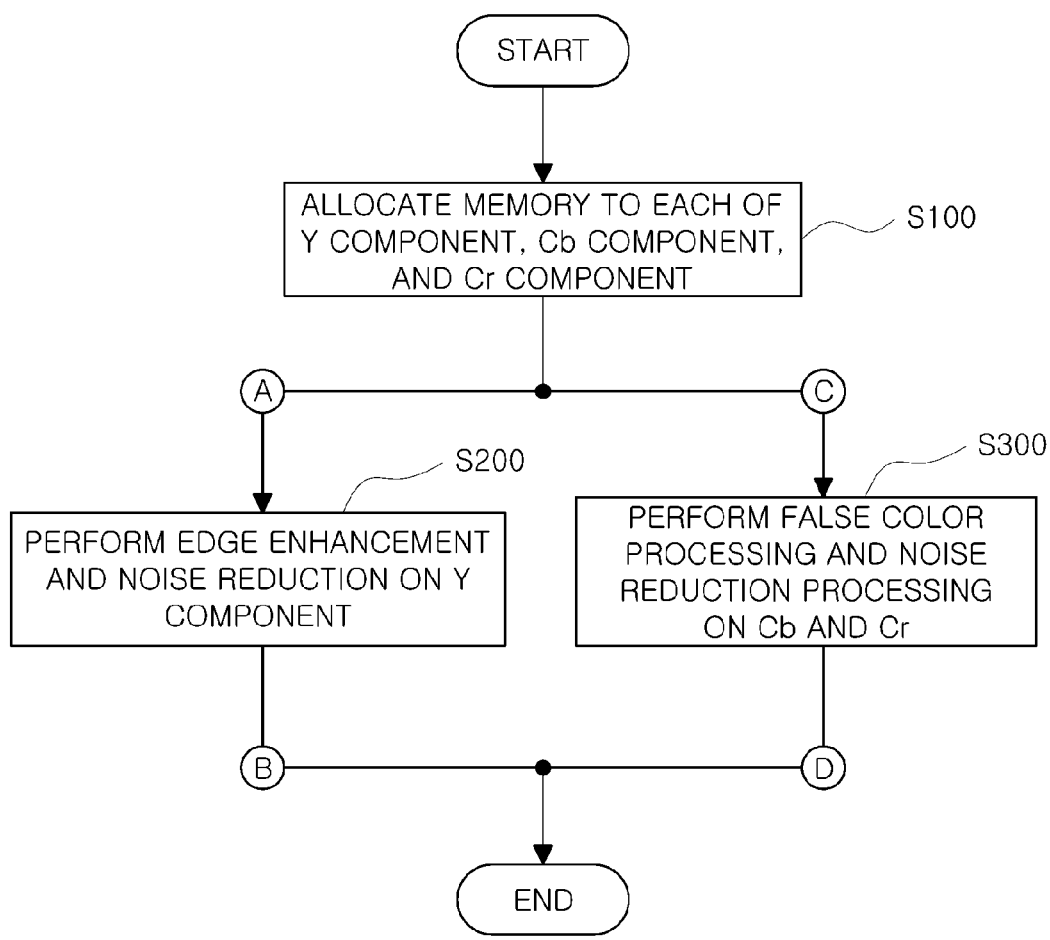
FIG. 2 is a flow chart illustrating a digital image processing method according to an embodiment of the inventive concept.

FIG. 2 is a flow chart illustrating a digital image processing method according to an embodiment of the inventive concept.

The digital image processing method according to an embodiment of the inventive concept will be described with reference to FIG. 2 as follows.

First, a memory is allocated to each of the Y component, the Cb component and the Cr component (S100). The image sensor according to an embodiment of the inventive concept may include a memory in order to process image data. The memory may be a SRAM type line memory and a plurality of memories may be provided. When the provided memories are a plurality of line memories, 2N memories are allocated to the Y component, and 2N line memories may be allocated to the Cb component and the Cr component. Here, N may be a natural number. Also, in this case, N number of line memories may be allocated to each of the Cb component and the Cr component. For example, four line memories may be allocated to the Y component and four line memories may be allocated to the Cb component and the Cr component.

Next, edge enhancement processing and noise reduction processing are performed on the Y component (S200). Also, false color suppression processing and noise reduction processing are performed on the Cb and Cr components (S300). Steps S200 and S300 may be performed concurrently.

Figure 3:
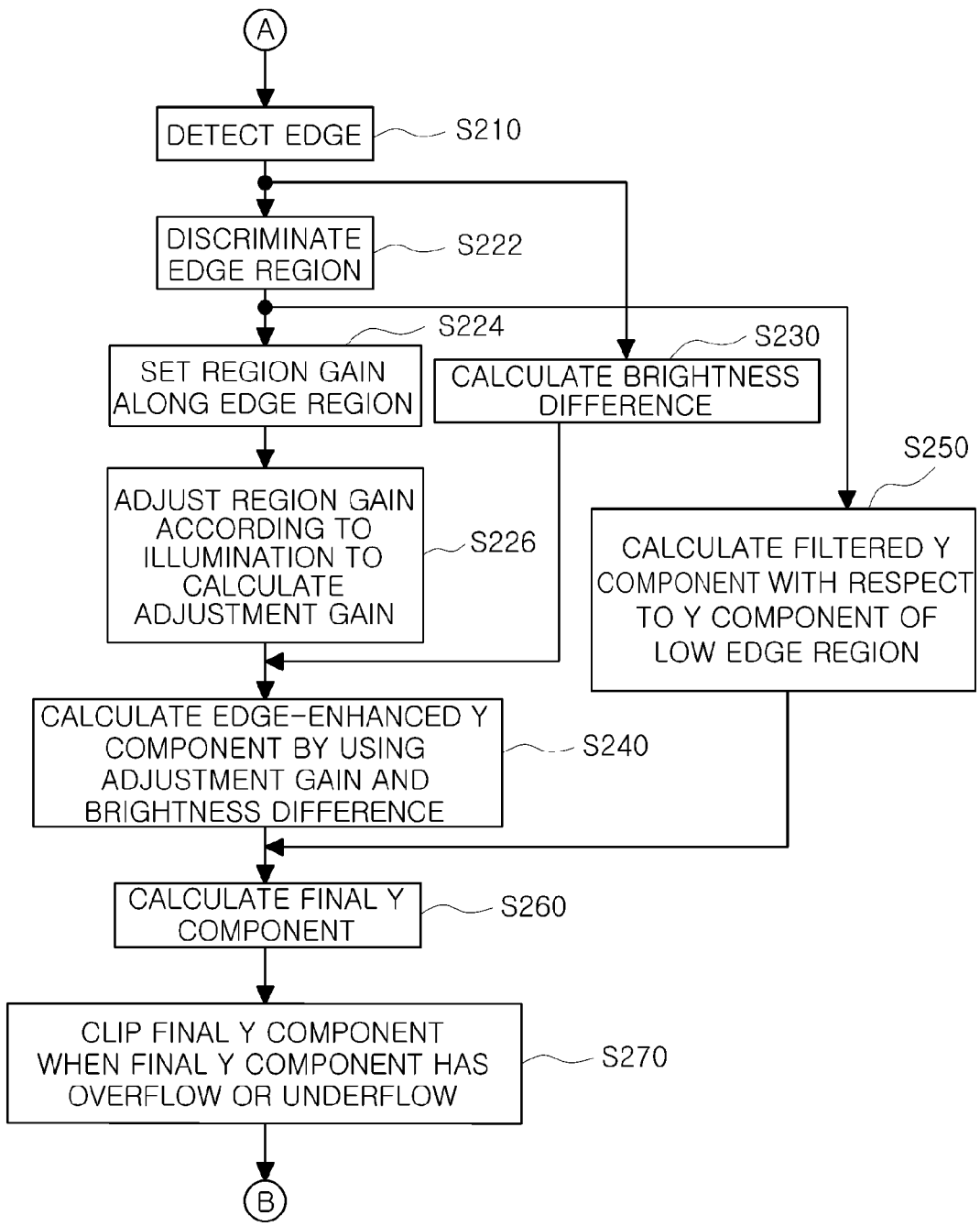
FIG. 3 is a flow chart illustrating an operation of processing a Y component in image data.

FIG. 3 is a flow chart illustrating the step (S200) of processing a Y component in image data in the digital image processing method illustrated in FIG. 2.

The step S200 of processing the Y component will be described with reference to FIG. 3 as follows.

An edge of the Y component (S210) is detected. When an edge of the Y component is detected, with respect to the Y component, the edge may be detected in consideration of four directions such as a vertical direction, a horizontal direction, a diagonal direction, and a reverse diagonal direction by using a 5×5 window operation. For example, the Y component may be 5×5 Y matrix data Y_mt. In this case, a 3×3 local matrix may be generated in the 5×5 Y matrix data Y_mt, and then, an edge may be detected in consideration of four directions such as the vertical direction, the horizontal direction, the diagonal direction, and the reverse diagonal direction.

Next, a gain is set for the Y component (S222 to S226).

First, an edge region is determined by using the edge detected in step S210 (S222). In this case, an edge map may be calculated by performing 5×5 mask generation processing on the Y component and simultaneously performing 3×3 local mask processing in a 5×5 global mask. Through the edge map, the edge region of the Y component may be determined as a low edge region, a middle edge region, and a high edge region. For example, when the size of the edge map EM(x,y) with respect to a pixel at the position (x,y) is smaller than a first edge value, the corresponding pixel may be determined to be included in (or belong to) the low edge region. When the size of the edge map EM(x,y) is greater than or equal to the first edge value but smaller than a second edge value, the corresponding pixel may be determined to be included in the middle edge region. When the size of the edge map EM(x,y) is greater than or equal to the second edge value, the corresponding pixel may be determined to be included in the high edge region. The second edge value may be greater than the first edge value.

A region gain according to the edge region is set (S224).

Figure 4:
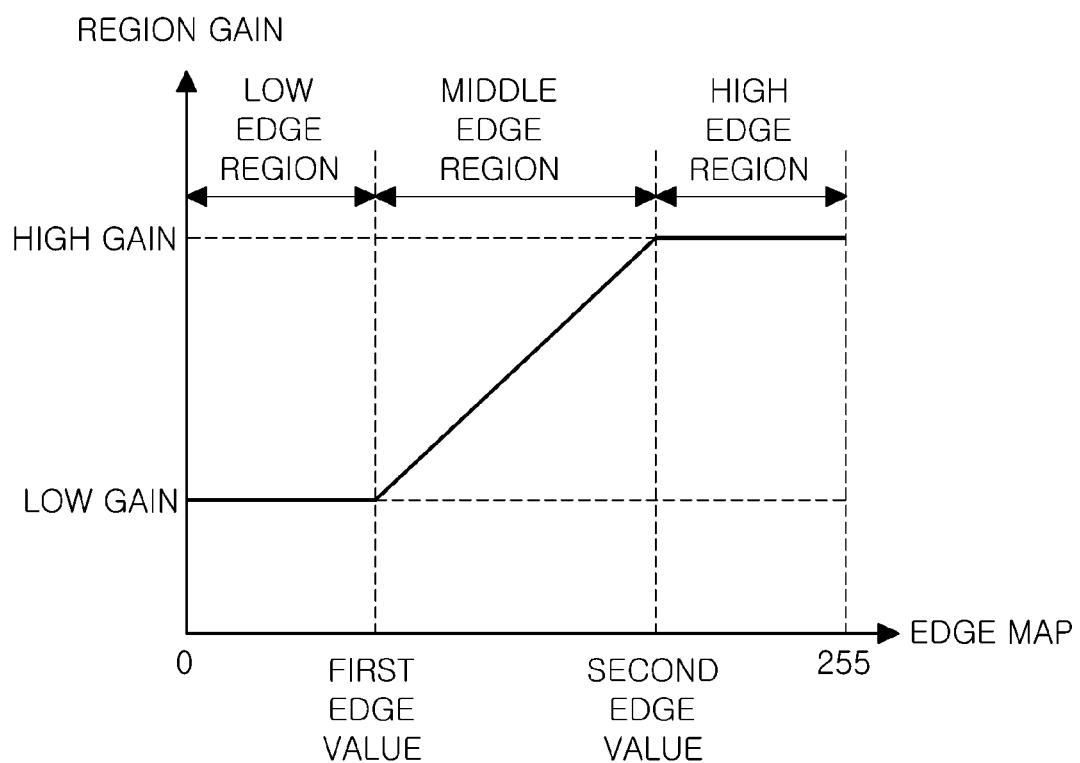
FIG. 4 is a graph for explaining a step of setting a region gain in the method for processing the Y component shown in FIG. 3.

FIG. 4 is a graph for explaining the step (S224) of setting a region gain in the step (S200) of processing the Y component shown in FIG. 3. The method of setting a region gain will be described with reference to FIG. 4 as follows.

A region gain with respect to a low edge may be set to be a low gain, and a region gain with respect to a high edge region may be set to be a high gain, and a region gain with respect to a middle edge region may be set to be a gain value determined in proportion to the value of the edge map among gain values between the low gain and the high gain. For example, when the pixel at the position (x,y) is included in the low edge region according to the results of performing step S222, the region gain with respect to the pixel may be set to be a low gain. If the pixel at the position (x,y) is included in the middle edge region according to the results of performing step S222, the region gain with respect to the pixel may be set to be a gain value determined in proportion to the size of the edge map EM(x,y) of the pixel among values between the low gain and the high gain. If the pixel at the position (x,y) is included in the high edge region according to the results of performing step S222, the gain region with respect to the pixel may be set to be a high gain. The high gain may have a gain value greater than that of the low gain.

Next, an adjustment gain is calculated by adjusting the region gain according to illumination (i.e., intensity of illumination, luminous intensity, or illuminance) (S226).

Figure 5:
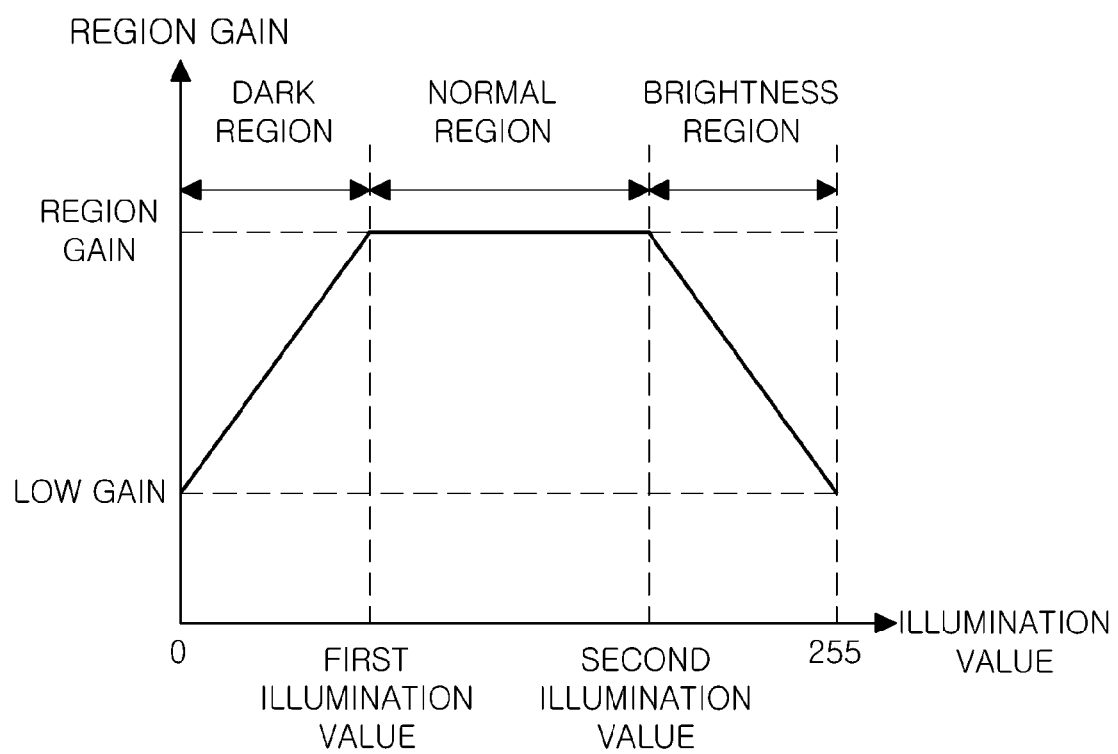
FIG. 5 is a graph for explaining a step of calculating an adjustment gain by adjusting a region gain in the method for processing the Y component shown in FIG. 3.

FIG. 5 is a graph for explaining the step S226 of calculating an adjustment gain by adjusting a region gain and in the step of processing the Y component shown in FIG. 3. The method of calculating an adjustment gain will be described with reference to FIG. 5 as follows.

With respect to a normal region in which the size of the Y component is greater than or equal to a first illumination value and smaller than a second illumination value, an adjustment gain may have a value equal to that of the region gain set in step S224. With respect to a dark region in which the size of the Y component is smaller than the first illumination value, the adjustment gain may have a gain value determined in proportion to the size of the Y component among gain values between the low gain and the region gain set in step S224. With respect to a bright region in which the size of the Y component is greater than or equal to the second illumination value, the adjustment gain may have a gain value determined in inverse proportion to the size of the Y component among gain values between the region gain set in step S224 and the low gain. For example, when the size Y(x,y) of the Y component of the pixel at the position (x,y) is greater than or equal to the first illumination value and smaller than the second illumination value, the pixel may be determined to be included in the normal region, and the adjustment gain with respect to the pixel may have the same value as that of the region gain with respect to the pixel set in step S224. If the size Y(x,y) of the Y component of the pixel at the position (x,y) is smaller than the first illumination value, the pixel may be determined to be included in the dark region, and the adjustment gain with respect to the pixel may have a gain value determined in proportion to the size Y(x,y) of the Y component of the pixel among gain values between the low gain and the region gain with respect to the pixel set in step S224.

If the size Y(x,y) of the Y component of the pixel at the position (x,y) is greater than or equal to the second illumination value, the pixel may be determined to be included in the bright region, and the adjustment gain with respect to the pixel may have a gain value determined in inverse proportion to the size Y(x,y) of the Y component of the pixel among the gain values between the region gain with respect to the pixel set in step S224 and the low gain.

Also, a brightness difference is calculated by using the Y component (S230). In this case, averaging-filtering may be performed on the center weight with respect to the Y component to calculate a blurred Y component, and then, the blurred Y component may be subtracted from the Y component, thus calculating a brightness difference. For example, when the size of the Y component with respect to the position (x,y) is Y(x,y), the size of the blurred Y component is Yblur(x,y), and the brightness difference of the pixel is Ydiff(x,y). The brightness difference may be determined by Equation shown below:

$$Y\text{diff}(x,y) = Y(x,y) - Y\text{blur}(x,y)$$

Here, the brightness difference of the pixel has a value corresponding to brightness of the pixel and the brightness of pixels neighboring the pixel.

Step S230 may be performed simultaneously with the steps S222 to S226 of calculating the foregoing gain, or before or after.

Next, in step S240, the edge-enhanced Y component is calculated according to the adjustment gain calculated in step S226 and the brightness difference calculated in step S230 (S240). In this case, a value obtained by adding the value obtained by multiplying the adjustment gain and the brightness difference to the Y component may be calculated as the edge-enhanced Y component. The edge-enhanced Y component may be obtained by multiplying the adjustment gain and the brightness difference and adding the result to the Y component. For example, when the adjustment gain at the position (x,y) is EG(x,y), the brightness difference with respect to the pixel is Ydiff(x,y), the Y component of the pixel is Y(x,y), and the edge-enhanced Y component with respect to the pixel is YEE(x,y), then, the edge-enhanced Y component YEE(x,y) may be calculated by the Equation shown below:

$$YEE(x,y) = EG(x,y) \times Ydiff(x,y) + Y(x,y)$$

Also, noise reduction processing is performed on the Y component of the low edge region (S250). Averaging filtering using a variable center weight is performed on the Y component at the low edge region, thereby performing low pass filtering on the Y component of the low edge region to calculate a noise-reduced Y component (YNR) (namely, a filtered Y component). As a result, noise reducing based on a 5×5 window available for center weight controlling is performed on the Y component of the low edge region.

Next, a final Y component is calculated (S260). In this case, the final Y component of the middle edge region and the high edge region may be an edge-enhanced Y component, and the final Y component of the low edge region may be a noise-reduced Y component YNR (i.e., a filtered Y component). For example, it is assumed that a final Y component with respect to the pixel at the position (x,y) is YO(x,y). If the pixel is included in the middle edge region or the high edge region, the final Y component YO(x,y) may be the edge-enhanced Y component YEE(x,y) with respect to the pixel calculated in step S240. If the pixel is included in the low edge region, the final Y component YO(x,y) may be the filtered Y component with respect to the pixel calculated in step S250.

Next, when the final Y component has an overflow or an underflow, the final Y component is clipped and output (S270).

Figure 6:
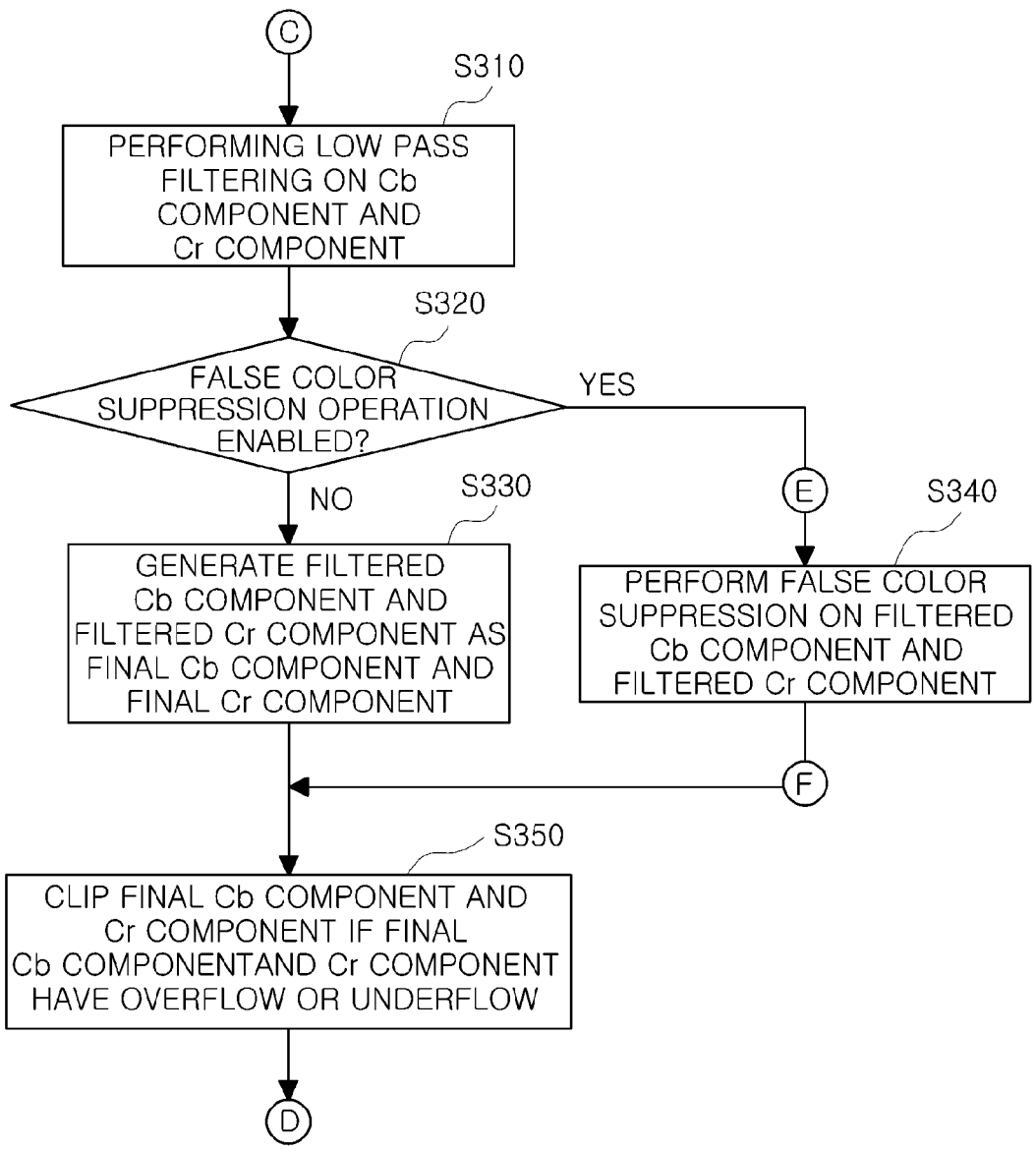
FIG. 6 is a flow chart illustrating a step of processing a Cb component and a Cr component of image data in the method for processing a digital image according to an embodiment of the inventive concept shown in FIG. 2.

FIG. 6 is a flow chart illustrating a step (S300) of processing the Cb component and the Cr component of image data in the digital image processing method according to an embodiment of the inventive concept shown in FIG. 2.

The method for processing the Cb component and the Cr component will now be described with reference to FIG. 6.

First, noise reducing is performed on the Cb component and the Cr component, respectively (S310). Averaging filtering using the variable center weight may be performed on each of the Cb component and the Cr component, thereby performing low pass filtering on the Cb component and the Cr component to calculate the filtered Cb component and the filtered Cr component. As a result, noise reducing based on a 5×5 window available for center weight controlling is performed on each of the Cb component and the Cr component. This may be performed together with a 5×5 mask generation with respect to the Cb component and the Cr component.

Thereafter, it is determined whether a false color suppression operation has been enabled (S320).

When the false color suppression operation has not been enabled according to the determination result in step S320, the filtered Cb component and the filtered Cr component calculated in step S310 are generated as a final Cb component and a final Cr component, respectively (S330).

If the false color suppression operation has been enabled according to the determination result in step S320, the false color suppression operation is performed on the filtered Cb component and the filtered Cr component to generate a final Cb component and a final Cr component (S340).

And then, when the final Cb component and the final Cr component generated in step S330 or the final Cb component and the final Cr component generated in step S340 have an overflow or an underflow, the final Cb component and/or the final Cr component are clipped, and the resultant components are output (S350).

Figure 7:
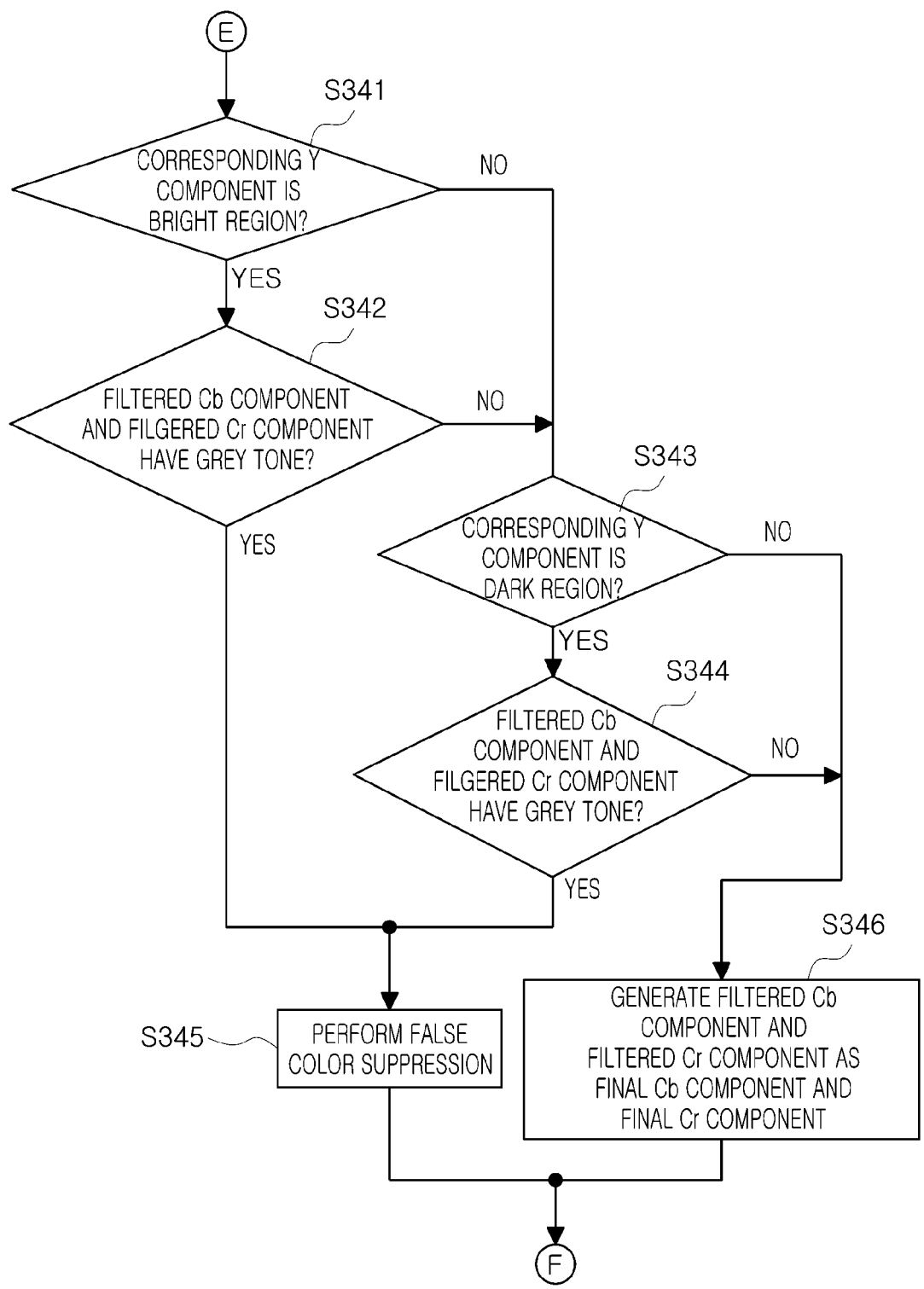
FIG. 7 is a flow chart illustrating a step of performing a false color suppressing operation in the method for processing the Cb component and the Cr component shown in FIG. 6.

FIG. 7 is a flow chart illustrating a step (S340) of performing a false color suppressing operation in the method for processing the Cb component and the Cr component shown in FIG. 6.

The false color suppression processing (S340) will be described with reference to FIG. 7 as follows.

Hereafter, it is assumed that the false color suppression processing is performed on the pixel at the position (x,y).

First, it is determined whether the pixel is included in the bright region (S341). For example, when the size of the Y component Y(x,y) of the pixel is greater than or equal to the second illumination value, the pixel may be determined to be in the bright region.

When the pixel is determined to be in the bright region according to the determination result in step S341, it is determined whether the pixel has a gray tone based on the filtered Cb component and the filtered Cr component of the pixel calculated in step S310 (S342).

When it is determined that the pixel is not in the bright region according to the determination result in step S341 or when it is determined that the pixel does not have a gray tone according to the determination result in step S342, it is determined whether the pixel is included in the dark region (S343). For example, when the size of the Y component Y(x,y) of the pixel is smaller than the first illumination value, the pixel may be determined to be in the dark region.

When it is determined that the pixel is included in the dark region according to the determination result in step S343, it is determined whether the pixel has a gray tone based on the filtered Cb component and the filtered Cr component of the pixel calculated in step S310 (S344).

When it is determined that the pixel has a gray tone according to the result of step S342 and the result of step S344, the false color suppression operation is performed and the false color-suppressed Cb and Cr components are generated as final Cb and Cr components, respectively (S345).

Namely, in an embodiment of the inventive concept, whether there is a false color may be determined based on a false color detection threshold value, and then, a false color may be eliminated. For example, whether both the Cb component and the Cr component have a gray tone is determined by using the false color detection threshold value. When both the Cb component and the Cr component have a gray tone, the false color may be eliminated such that the Cb component and the Cr component of the corresponding pixel may have more gray tone.

When it is determined that the pixel is not included in the dark region according to the determination result in step S343 or when the pixel does not have a gray tone according to the determination result in step S344, the filtered Cb component and the filtered Cr component calculated in step S310 are generated as a final Cb component and a final Cr component (S346).

As a result, when a particular pixel is in the bright region or dark region and has a gray tone, false color suppression processing is performed on the particular pixel.

The digital image processing method as described above may be used in a digital camera, a mobile phone, a PC camera, a personal digital assistant (PDA), and the like.

As set forth above, according to embodiments of the invention, the digital image processing apparatus and method can efficiently use the memory (or memories), the size of the memory required for performing the image processing operation can be reduced, and as a result, the size of an image sensor chip can also be reduced.

While the inventive concept has been shown and described in connection with the described embodiments, it will be apparent to those skilled in the art that modifications and variations can be made without departing from the spirit and scope of the invention as defined by the appended claims.

What is claimed is:

1. A digital image processing apparatus comprising:
a y component processing unit receiving a Y component and performing edge enhancement processing and first noise reduction processing on the Y component by using a memory allocated to the Y component; and
a CbCr processing unit receiving a Cb component and a Cr component, and performing false color suppression processing and second noise reduction processing on the Cb component and the Cr component by using a memory allocated to the Cb component and the Cr component, where the Y component, the Cb component and the Cr component are variables of a YCbCr color space.

2. The apparatus of claim 1, wherein the memory allocated to the Y component includes 2n (where n is a natural number) number of line memories, and the memory allocated to the Cb component and the Cr component includes 2n number of line memories.

3. The apparatus of claim 1, wherein the Y component processing unit comprises:
a first memory unit having memory allocated to the Y component, receiving the Y component, and generating Y matrix data;
an edge region discrimination unit receiving the Y matrix data, detecting an edge, discriminating edge regions by using the detected edge, and outputting Y data of each region; and
an edge enhancement and noise reduction unit receiving the Y data of each region, and generating edge-enhanced Y data and noise-reduced Y data.

4. The apparatus of claim 3, wherein, when a size of an edge map of a corresponding pixel is smaller than a first edge value, the edge region discrimination unit outputs the Y matrix data corresponding to the pixel, as low edge Y data,
when the size of the edge map of the corresponding pixel is greater than or equal to a second edge value that is greater than the first edge value, the edge region discrimination unit outputs the Y matrix data corresponding to the pixel, as high edge Y data, and
when the size of the edge map of the corresponding pixel is greater than or equal to the first edge value and less than the second edge value, the edge region discrimination unit outputs the Y matrix data corresponding to the pixel, as middle edge Y data.

5. The apparatus of claim 4, wherein the edge enhancement and noise reduction unit comprises:
an edge enhancement unit receiving the high edge Y data and the middle edge Y data and generating the edge-enhanced Y data; and
a Y noise reducer receiving the low edge Y data and generating the noise-reduced Y data.

6. The apparatus of claim 1, wherein the CbCr processing unit comprises:
a second memory unit having a memory allocated to the Cb component and the Cr component, receiving the Cb component and the Cr component, and generating Cb matrix data and Cr matrix data;
a low pass filter low-pass-filtering the Cb matrix data and the Cr matrix data to generate filtered Cb data and filtered Cr data; and
a false color suppression unit receiving the filtered Cb data and the filtered Cr data and generating false color-suppressed Cb data and false color-suppressed Cr data.

7. A digital image processing method comprising:
allocating memories to a Y component, a Cb component, and a Cr component;
performing edge enhancement processing and first noise reduction processing on the Y component by using a memory allocated to the Y component; and
performing false color suppression processing and second noise reduction processing on the Cb component and the Cr component by using a memory allocated to the Cb component and the Cr component.

8. The method of claim 7, wherein the memory is a plurality of static random access memory (SRAM) type line memories, 2n (n is a natural number) number of memories are allocated to the Y component and 2n number of memories are allocated to the Cb component and the Cr component.

9. The method of claim 8, further comprising: allocating n number of memories to the Cb component and allocating n number of memories to the Cr component.

10. The method of claim 7, performing edge enhancement and first noise reduction processing, further comprises:
calculating an edge map by using the Y component of a corresponding image, and determining an edge region to which a corresponding pixel belongs by using the edge map;
setting a region gain of the corresponding pixel according to the edge region to which the corresponding pixel belongs;
adjusting the region gain of the corresponding pixel according to illumination of the corresponding pixel to calculate an adjustment gain of the corresponding pixel;
calculating a brightness difference of the corresponding pixel from the Y component of the image; and
calculating an edge-enhanced Y component of the corresponding pixel by using the adjustment gain of the corresponding pixel and the brightness difference of the corresponding pixel.

11. The method of claim 10, wherein, setting the region gain of the corresponding pixel further comprises:
setting the region gain of the corresponding pixel to a low gain when the size of an edge map of a corresponding pixel is smaller than a first edge value;
setting the region gain of the corresponding pixel to a high gain when the size of the edge map of the corresponding pixel is greater than or equal to a second edge value greater than the first edge value; and
setting the region gain of the corresponding pixel to have a gain value determined in proportion to the size of the edge map of the corresponding pixel among gain values between the low gain and the high gain when the size of the edge map of the corresponding pixel is greater than or equal to the first edge value and smaller than the second edge value.

12. The method of claim 11, wherein, calculating the adjustment gain of the corresponding pixel further comprises:
setting the adjustment gain of the corresponding pixel to be equal to the region gain of the corresponding pixel when a size of the Y component of the corresponding pixel is greater than or equal to a first illumination value and smaller than a second illumination value;
setting the adjustment gain of the corresponding pixel to have a gain value determined in proportion to a size of the Y component of the corresponding pixel among gain values between the low gain and the region gain of the corresponding pixel when the size of the Y component of the corresponding pixel is smaller than the first illumination value, the adjustment gain of the corresponding pixel is set to; and
setting the adjustment gain of the corresponding pixel to a gain value determined to be inversely proportional to the size of the Y component of the corresponding pixel among gain values between the region gain of the corresponding pixel and the low gain when the size of the Y component of the corresponding pixel is greater than or equal to the second illumination value.

13. The method of claim 10, where performing edge enhancement processing and first noise reduction processing further comprises performing noise reduction processing on the Y component of the image of a low edge region in which the size of the edge map is smaller than a first edge value to calculate a filtered Y component.

14. The method of claim 13, wherein performing edge enhancement processing and first noise reduction processing further comprises generating an edge-enhanced Y component of a pixel, as a final Y component, when the size of the edge map of the pixel is greater than or equal to the first edge value, and generating the filtered Y component of the pixel, as a final Y component, when the size of the edge map is smaller than the first edge value.

15. The method of claim 7, wherein performing false color suppression processing and second noise reduction processing further comprises:
performing the second noise reduction processing on each of the Cb component of the image and the Cr component of the image to calculate a filtered Cb component and a filtered Cr component; and
when false color suppression is enabled, performing false color suppression processing on the filtered Cb component and the filtered Cr component to generate a final Cb component and a final Cr component, and when the false color suppression is not enabled, generating the filtered Cb component and the filtered Cr component as the final Cb component and the final Cr component, respectively.

16. The method of claim 15, wherein performing false color suppression processing and second noise reduction processing further comprises:
performing the false color suppression processing on the corresponding pixel when the Y component of the corresponding pixel is smaller than a first illumination value or greater than or equal to a second illumination value that is greater than the first illumination value, when the corresponding pixel has a gray tone.

* * * * *